United States Patent

[72] Inventor John E. Sargeant
 Detroit, Mich.
[21] Appl. No. 849,080
[22] Filed Aug. 11, 1969
[45] Patented Apr. 27, 1971
[73] Assignee McCord Corporation
 Detroit, Mich.

[54] MOTOR AND PUMP ASSEMBLY
 5 Claims, 7 Drawing Figs.
[52] U.S. Cl. .................................................. 417/423
[51] Int. Cl. ............................................... F04d 13/02
[50] Field of Search .................................... 103/111
 (C), 111 (C4), 87 (subr); 230/117; 415/173, 174;
 417/423

[56] References Cited
 UNITED STATES PATENTS
 2,787,960 4/1957 Wightman .................. 103/111X
 3,425,355 2/1969 LaFlame et al. ............. 103/87X

[11] 3,576,380

Primary Examiner—Robert M. Walker
Attorney—Rudolph L. Lowell

ABSTRACT: A motor and pump assembly includes a motor housing having a shaft section projected from one end, and a pump housing having an inlet and an outlet open, respectively, to the bottom wall and sidewall of a circular cavity formed in one end of the pump housing. The shaft section carries an impeller at its outer end and a rotatable resilient disc-shape sealing member spaced inwardly from the impeller. With the impeller and sealing member received in the cavity and the one end of the pump housing in abutting engagement with the one end of the motor housing the sealing member is positioned adjacent the motor housing with its outer peripheral surface in sealing engagement with the cavity sidewall. The sealing member thus provides one wall of a chamber means for the impeller and a fluid seal between such chamber means and the motor housing.

PATENTED APR 27 1971

INVENTOR.
JOHN E. SARGEANT
BY Rudolph L. Lowell
ATTORNEY.

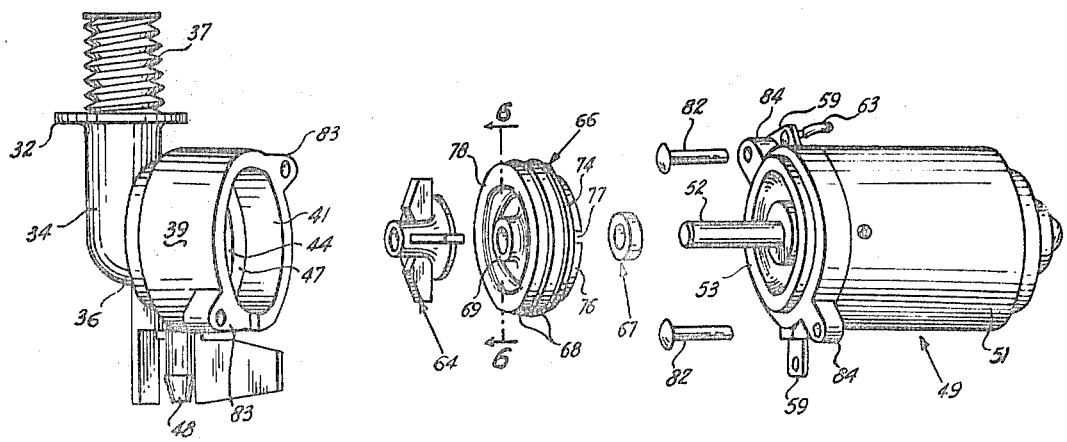
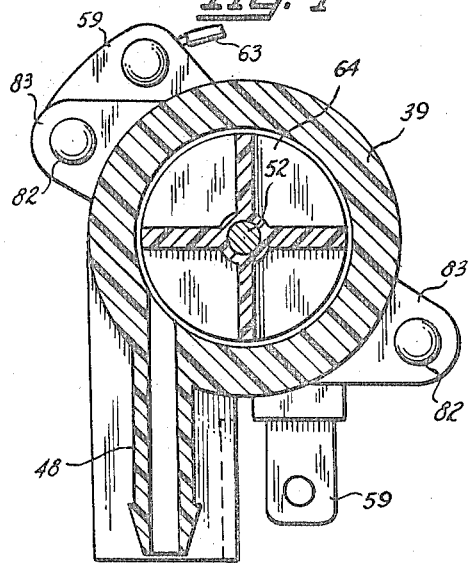
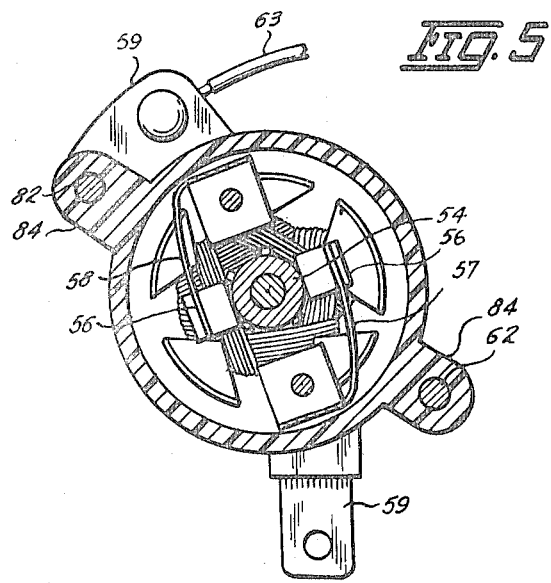
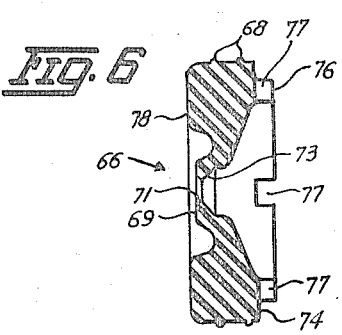
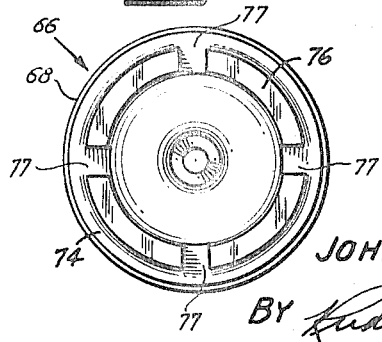
INVENTOR.
JOHN E. SARGEANT
BY Rudolph R. Lowell
ATTORNEY.

3,576,380

MOTOR AND PUMP ASSEMBLY

SUMMARY OF THE INVENTION

The motor and pump assembly is of a simple and compact construction and efficient in operation. The one-piece pump housing, with the impeller and sealing member mounted on the motor shaft, is operatively associated with the motor unit by merely inserting the impeller and sealing member within one end of the pump housing. As a result of this insertion, the sealing member forms one sidewall of a chamber means for the impeller concurrently with fluid sealing the chamber means from the motor housing. Close machining and operating tolerances are thus eliminated and assembly time is reduced to a minimum.

DESCRIPTION OF THE DRAWINGS

FIG. 3 is an exploded perspective view of the pump and motor assembly;

FIG. 4 and 5 are enlarged sectional views taken along lines 4—4 and 5—5, respectively, of FIG. 2.

FIG. 6 is a sectional view of a sealing member taken on line 6—6 in FIG. 2; and

FIG. 7 is a side elevational view of the sealing member as seen along line 7—7 in FIG. 3.

DETAIL DESCRIPTION OF A PREFERRED EMBODIMENT

Figure 1:
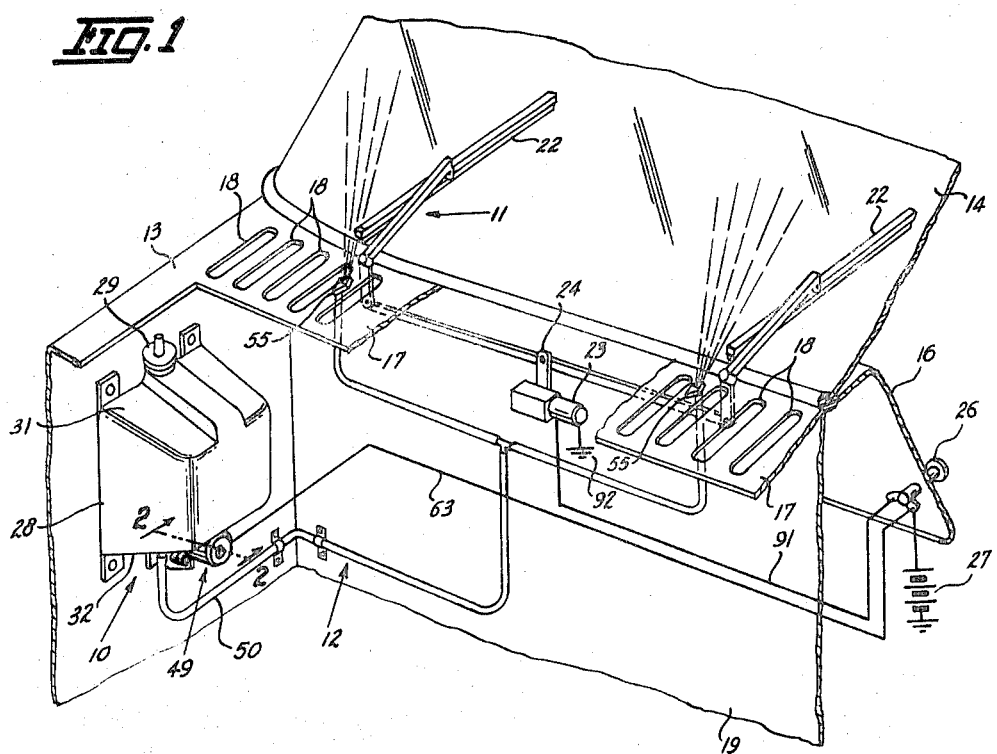
FIG. 1 is a fragmentary perspective view of a motor vehicle equipped with a windshield washer system embodying the motor and pump assembly of this invention.

The pump and motor assembly of this invention, indicated generally as 10, is illustrated in FIG. 1 as forming part of a vehicle windshield-clearing system that includes a wiper unit 11 and a washer unit 12. The vehicle 13 is shown in fragmentary form in FIG. 1 as having an outwardly and rearwardly inclined windshield 14 and a control panel or dashboard 16. Extended forwardly from the lower edge of the windshield 14 is a cowl 17 having a plurality of heater and ventilator openings 18. A fire wall 19 projects downwardly from the cowl 17 and separates the passenger compartment from the engine compartment. The opposite end of the fire wall 19 are secured to the sidewalls 21 (one of which is shown) which form part of the front fenders of the vehicle 13.

The wiper unit 11 includes a pair of wipers 22 movable in a usual manner across the windshield 14 by an electric motor 23 through a transmission system 24. The control switch 26 for the motor 23 is connected to the car battery 27.

The motor and pump assembly 10 is part of the washer unit 12 which additionally includes a reservoir 28 of a plastic material having a cap 29 for closing a fill opening in the top wall 31. The reservoir 28 has a bottom wall 32 provided with an opening 33 (FIG. 2) for receiving one section 34 of a tubular pump housing 36 of a generally elbow shape. The section 34 constitutes the inlet of the pump housing 36 and is formed with an externally threaded portion 37 that terminates at a collar or flange 38.

The other or body section 39 of the pump housing 36 is formed with a cavity or bore 41 (FIGS. 2 and 3) the inner or bottom wall 42 of which is open to the inlet passage 43 in the inlet section 34. The cavity 41 (FIG. 2) is formed with a pair of portions 44 and 46 of different diameters with the reduced diameter portion 44 being adjacent the inlet passage 43. There is thus provided a retaining shoulder 47 at the junction of the cavity portions 44 and 46. Extended tangentially through the sidewall of the small cavity portion 44, and best shown in FIG. 4, is the pump outlet 48 which is connected by fluid lines 50 (FIG. 1) to discharge nozzles 55 for supplying cleaning fluid onto the windshield 14 in the path of movement of the wipers 22.

The motor 49 of the assembly 10 includes a housing 51 and a shaft section 52 that projects axially outwardly from the housing end 53. The pump motor 49 is of a usual type and includes a commutator 54 (FIG. 5) operatively associated with brush elements 56 that form part of brush assemblies 57 and 58 having coupling conductors 59. As shown in FIG. 5 the coupling conductors 59 project outwardly from the housing 51 and have their inner ends anchored by screws 62 extended longitudinally of the motor housing. The outer end of one coupling conductor 59 is connected through a line 63 (FIGS. 1 and 5) to the control switch 26 and the outer end of the other conductor 59 is grounded to the sidewall 21 of the engine compartment.

Figure 2:
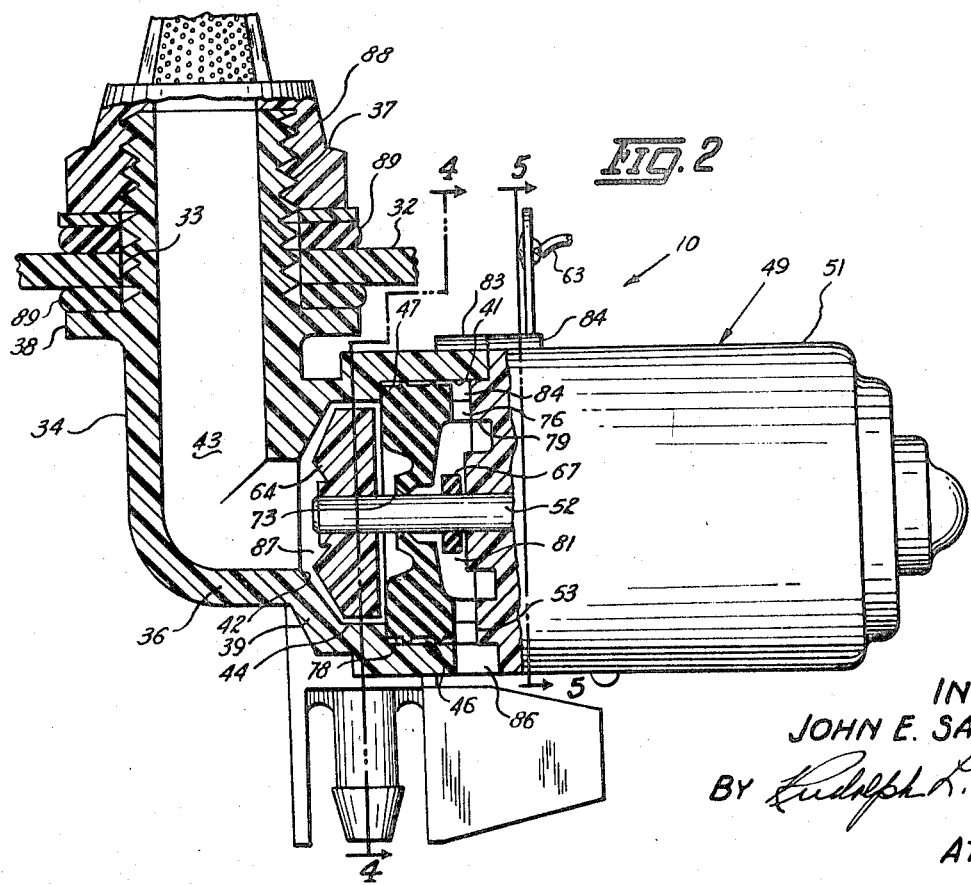
FIG. 2 is an enlarged sectional view of the pump and motor assembly taken along line 2—2 in FIG. 1.

As best shown in FIG. 2 a pump impeller 64 is mounted about and secured to the outer or free end of the shaft section 52 for rotation therewith. Positioned about the shaft section 52 between the impeller 64 and the motor housing 51 are a sealing member 66 and a slinger member 67 with the sealing member located adjacent to the impeller 64.

The sealing member 66 (FIGS. 3 and 7) is of a general disc shape comprised of a resilient material such as rubber. The outer peripheral surface of the sealing member is formed with a pair of axially spaced circumferentially extended flexible ribs or beads 68 having a diameter slightly larger than the diameter of the large cavity portion 46 in the pump housing 36. A hub unit 69 (FIGS. 3 and 6) for the sealing member 66 terminates in a general flexible tubular section 71 which extends radially inwardly and axially in a direction toward the impeller 64. The free end 72 of the tubular section 71 is of a triangular shape in longitudinal cross section so as to provide an apex portion or inner peripheral surface 73 for frictional contact engagement with the outer peripheral surface of the shaft section 52 (FIG. 2). The diameter of the inner peripheral surface 73 is slightly smaller than the diameter of the shaft section 52 so that when the shaft section is inserted through the tubular section 71 the apex portion 73 is yieldably stretched into frictional sealing engagement with the shaft section while permitting free rotation of the shaft section 52 relative to the sealing member 66.

The side 74 of the sealing member 66 (FIGS. 2 and 7) opposite the end 53 of the motor housing 51 is formed with an axially projected angular 76 that is spaced radially inwardly from the outer peripheral surface of the sealing member for a purpose to appear later. The flange 76 is formed with a plurality of radially extended notches 77 that are illustrated as being four in number.

In the assembly of the motor 49 with the pump housing 36, the impeller 64, sealing member 66 and slinger 67 are initially mounted on the shaft section 52. On relative axial movement of the pump body section 39 and motor housing 51 toward each other the impeller 64 is positioned within the cavity portion 44 and the sealing member 66 and 67 are located within the cavity portion 46. (FIG. 2) During this movement, the sealing member 66 is retained within the cavity portion 46 by engagement of the side 78 thereof adjacent the impeller 64 with the shoulder 47. Movement of the sealing member 66 against the shoulder 47 is effected by the abutting engagement of the flange 76 with an associated flange 79 projected radially of the motor housing end 53.

As clearly illustrated in FIG. 2 with the sealing member 66 located within the cavity portion 56 the slinger 67 is located within an annular chamber means 81 formed by the side 74 of the sealing member, the flange 76 and the end 53 of the motor housing 51. With the flange 79 on the motor housing end 53 having an outer diameter substantially equal to the inner diameter of the cavity portion 46, the sidewall of the cavity portion 46 is movable about the flange 29 and into abutting engagement with the housing end 53 to define the assembled position of the pump housing 36 with the motor housing 51. This assembly relation is maintained by the securing together by rivets 82 of corresponding pairs of ears or lugs 83 and 84 provided on the housing 36 and 51, respectively.

It is thus seen that the sealing member 66 forms a sidewall for a chamber means 87 for the impeller 64 concurrently with fluid sealing the chamber means 87 from the pump motor 49.

This fluid seal is obtained by the continuous bias of apex portion 73 into contact engagement with the outer peripheral surface of the motor shaft section 52 and the flexing of the beads 68 into frictional engagement with the inner peripheral surface of the cavity portion 46. Additionally, it will be apparent that this fluid sealing of the chamber means 89 from the motor 49 is effected concurrently with the operative assembly of the pump housing 36 and motor housing 53.

It is to be noted that the notches 77 (FIG. 2) in the flange 76 are open to the annular chamber means 81 and to an annular passage 84 that is formed by the adjacent sides of the sealing member 66 and motor housing end 53, the flange 79 and the inner peripheral surface of the sidewall of the cavity portion 46. The annular passage 84 is open to the atmosphere through a drain opening 86 formed in the sidewall of the cavity portion 46.

The pump and motor assembly 10 is connected with the reservoir 28 by insertion of the threaded portion 37 on the pump housing inlet section 34 within the opening 33. The assembly 10 is secured to the reservoir by a combination locking nut and screen unit 88 that is threadable about the inwardly projected portion 37 for effecting a cooperating clamp action with the collar 38 relative to the reservoir bottom wall 32. A fluid seal about the inlet section 34 is provided in a usual manner by the mounting of gaskets 89 about the inlet section to opposite sides of the reservoir bottom wall 32.

In use, the impeller pump is always primed by virtue of the gravity feed of fluid from the reservoir 28 into the chamber means 87 through the inlet passage 43. On energization of the pump motor 49 fluid is immediately discharge from the pump outlet 48 for delivery under pressure into the fluid lines 50 and through the nozzles 55 onto the vehicle windshield 14. The wiper motor 23 is connected by a line 91 with the control switch 26, and by a ground 92 with the fire wall 19. In one position the control switch 26 provides for the operation of only the wiper motor 23, at a second position for the concurrent operation of the wiper motor 23 and pump motor 49 and in the third position opens the circuits of the motors 23 and 49. Thus, in the operation of the washer unit 12 the switch 23 is manually moved to its second position to energize the wiper motor 23 and to connect the car battery 27 to the line 63 to energize the pump motor 49.

Any water that might escape from the pump chamber means 87 through the sealing member wall 66 along the shaft section 52 is picked up by the slinger 67 for movement by centrifugal action from the annular chamber means 81 through the notches 77 and into the annular passageway 84 for discharge through the drain 86.

I claim:

1. A pump and motor assembly including:
   a. a pump housing having an inlet and an outlet, said housing having a circular cavity in one end thereof, said inlet open to the bottom wall of said cavity and said outlet to the sidewall of said cavity,
   b. a motor unit including a housing and a shaft section projected from one end of the motor housing,
   c. an impeller mounted on the outer end of said shaft section,
   d. a disc-shape resilient sealing member rotatably mounted on said shaft section between the one end of said motor housing and impeller, said sealing member having an inner peripheral surface biased into bearing engagement with the outer peripheral surface of the shaft section,
   e. said sealing member and impeller positioned within said cavity with the outer peripheral surface of the sealing member in bearing engagement with a sidewall portion of the cavity and the side of the sealing member remote from the impeller in contact engagement with said one end of the motor housing whereby said sealing member and cavity form a chamber means for said impeller, and
   f. means for securing together said pump housing and motor housing.

2. The pump and motor assembly according to claim 1 wherein the outer peripheral surface of said sealing member is formed with a series of axially spaced circumferentially extended ribs, with the diameter of said ribs being slightly greater than the diameter of said cavity at said side wall portion thereof.

3. The pump and motor assembly according to claim 1 wherein said sealing member has a flexible hub section projected from one side thereof, said hub section terminating in a portion of a triangular shape in transverse cross section projected radially inwardly with the apex of said triangular portion in biased bearing engagement with the outer peripheral surface of said shaft section.

4. The pump and motor assembly according to claim 1 wherein said remote side of the sealing member includes an annular ring member projected axially therefrom having an outer peripheral surface continuous with the outer peripheral surface of the sealing member, and engageable with the one end of said motor housing.

5. The pump and motor assembly according to claim 4 wherein:
   a. said annular ring member is formed with circumferentially spaced drain openings extended radially therethrough, and
   b. the sidewall of the cavity having a drain opening in fluid registration with the drain openings in said annular ring member.